UNITED STATES PATENT OFFICE.

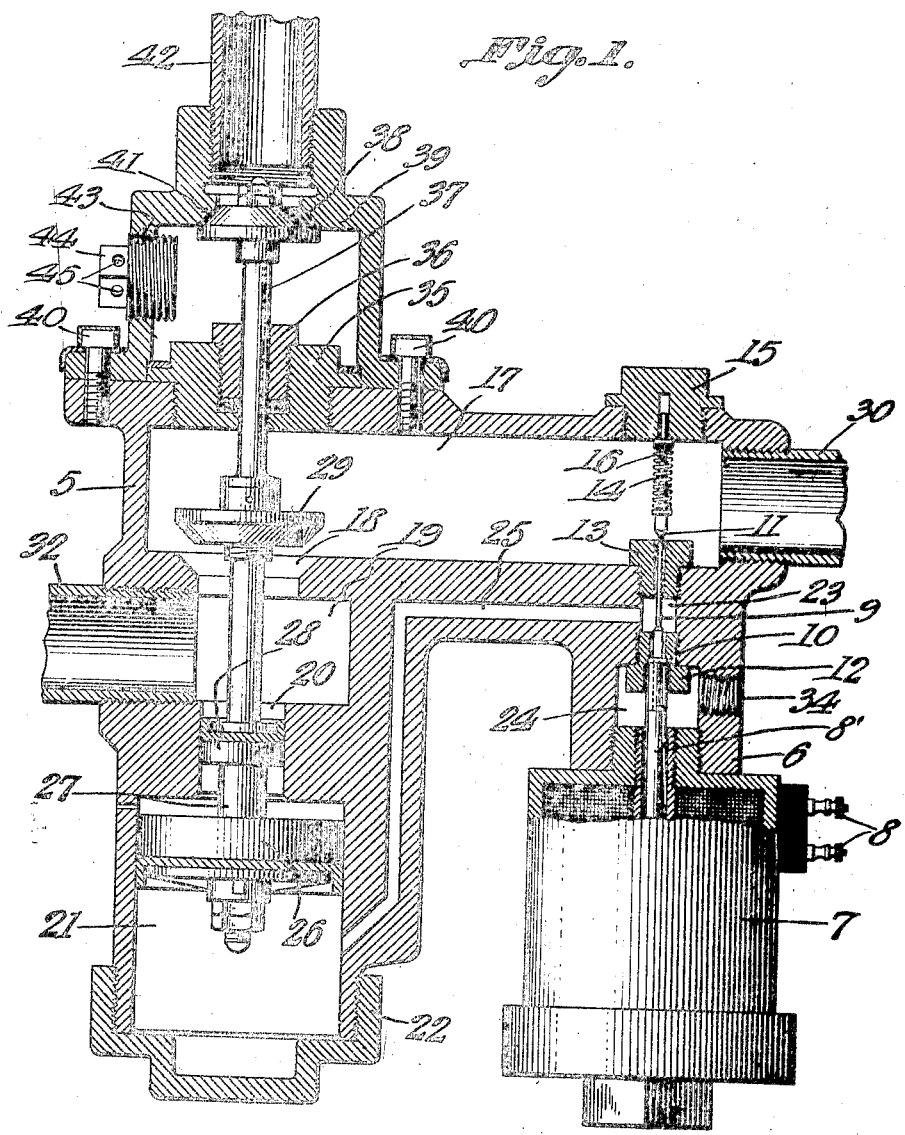

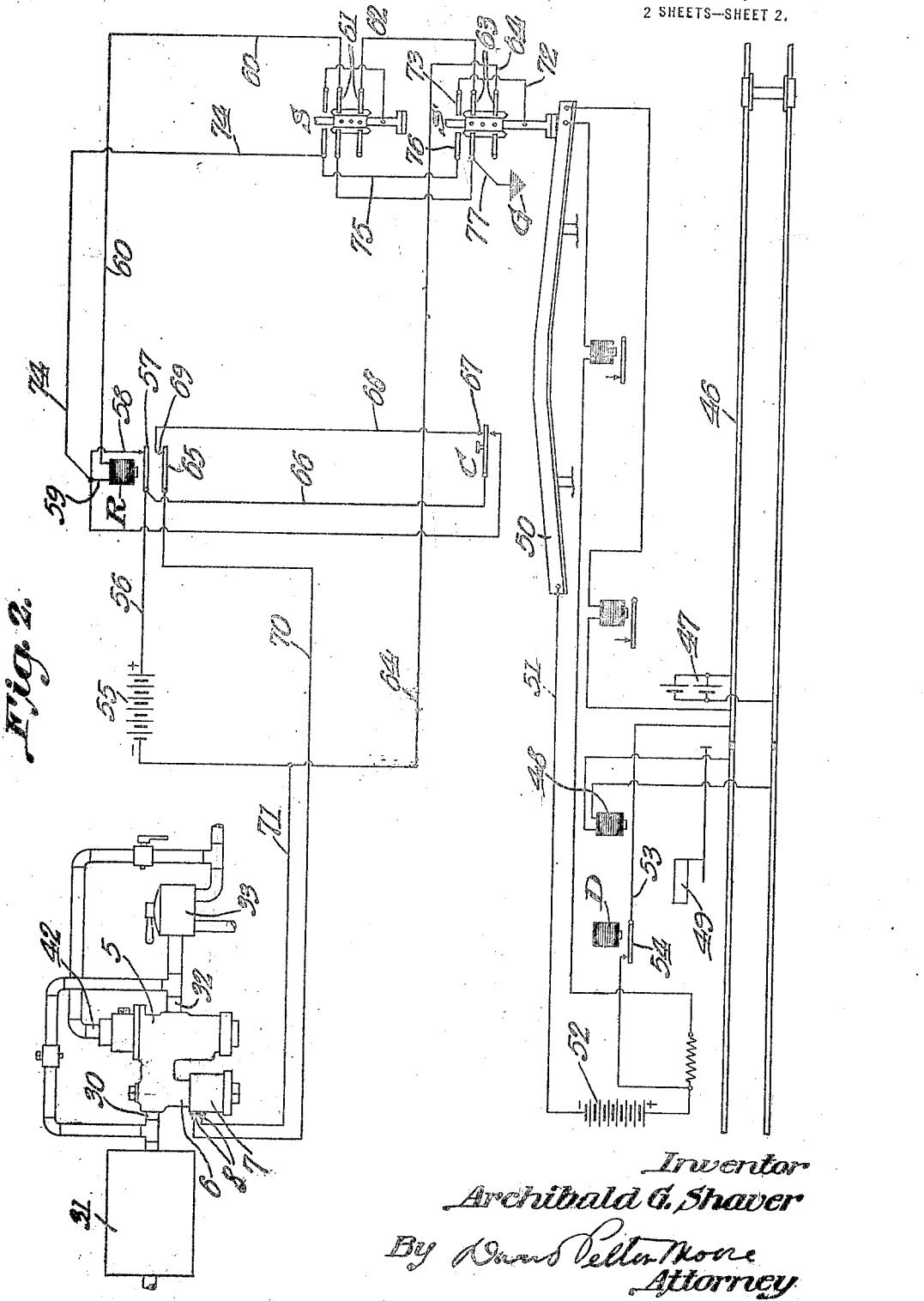

ARCHIBALD G. SHAVER, OF CHICAGO, ILLINOIS, ASSIGNOR, BY MESNE ASSIGNMENTS, TO REGAN SAFETY DEVICES COMPANY, INC., A CORPORATION OF NEW YORK.

COMBINED RESERVOIR AND BRAKE VALVE.

1,411,526.

Specification of Letters Patent. Patented Apr. 4, 1922.

Application filed May 12, 1919. Serial No. 296,683.

*To all whom it may concern:*

Be it known that I, ARCHIBALD G. SHAVER, a citizen of the United States, residing at Chicago, in the county of Cook and State of Illinois, have invented certain new and useful Improvements in Combined Reservoir and Brake Valves, of which the following is a specification, reference being had therein to the accompanying drawing.

This invention relates to improvements in automatic stop and train control systems, one object of the invention being the provision of a system in which the valve for controlling the reservoir and also for operating the air brake system to bring the vehicle to a stop is controlled by a single electromagnet, thus simplifying to a great extent the constructions shown in my copending applications filed April 25, 1919, Ser. Nos. 292,547 and 292,549.

A further object of this invention is the provision of a combined reservoir and brake valve in which a single casing is employed for carrying the valve for isolating the reservoir from the engineer's valve and for venting the air brake system to bring the train to a halt.

A still further object of this invention is the provision of a combined reservoir and brake valve in which all of the parts are so disposed and arranged as to operate to produce a danger condition due to the failure either of the electricity or of the air, the air controlling valves being so disposed and positioned as to operate by gravity and the whole construction being so simple as to be readily connected in the air brake systems as are now used.

In the accompanying drawings:

Figure 1 is a sectional view through the complete valve, a portion of the electromagnet being shown in section.

Figure 2 is a diagrammatic view of one method of applying the present apparatus to be operated by what is known as the intermittent contact or ramp rail and shoe combination.

Referring to the drawings, the numeral 5 designates the main casing of the combined reservoir and brake valve which is provided with the interiorly threaded projection 6 for the removable attachment thereto of the electromagnet 7 provided with terminals 8. The stem 8' controlled by the electromagnet is connected to the reduced stem 9 which operates the needle valves 10 and 11 which in turn are mounted for vertical sliding movement in the respective valve seats carrying bushings 12 and 13, the electromagnet when energized holding the valve 10 seated as illustrated, with the valve 11 unseated. Both of these valve seating bushings are removable and can be replaced without disturbing the main casing. The auxiliary stem 14 of the two valves 10 and 11 is guided in the removable block 15 and has mounted thereon a spring 16 which acts in opposition to the electromagnet so as to assist in seating the valve 11 when the electromagnet is de-energized. The casing as shown is provided with a chamber 17 which communicates through the valve seat 18 with the chamber 19, while below the chamber 19 is the reduced plunger chamber 20 and the enlarged plunger chamber 21 which is sealed by the removable cap 22. The bore 23 in which is slidable the stem 9 and which also forms a communicating means through the respective bushings 12 and 13 with the chamber 17 and the chamber 24, has a channel or duct 25 leading therefrom into the lower end of the enlarged piston chamber 21, the purpose of which will presently appear.

Mounted in the chamber 21 is a piston 26 whose stem 27 has mounted thereon the auxiliary piston 28 mounted in the chamber 20, such stem extending through the valve seated port 18 and carrying the valve 29 which controls such port but which under normal conditions is upward and unseated. The chamber 17 is connected at one end to the pipe 30 which leads to the auxiliary reservoir 31 while the chamber 20 is connected through the pipe 32 to the engine man's brake valve 33 and with the parts in normal position as illustrated, air passes from the reservoir through the port in the bushing 13 into the bores 23 and 25 to the lower end of the piston chamber 21, elevating the piston 26 and also the auxiliary piston 28 so that the valve 29 is unseated and air is permitted to flow to the engineer's brake valve. Should the electromagnet fail or become de-energized the valve 11 will be seated and the valve 10 unseated, thus permitting the air pressure to operate upon the auxiliary piston 28, while the air in the lower end of the chamber 21 will be open to the atmosphere due to the unseating of the valve 10 which permits the air to flow from the lower end of the chamber 21 through the channels 25 and 23 into the chamber 24 to be vented through the port 34. In this way the reservoir is cut off from the engine-man's brake valve and it is impossible for him to recharge the brake pipe system of the train through this valve until the electromagnet is again energized.

Fitted into the wall of the chamber 17 at a point directly above the valve seated port 18 is a block 35 provided with a stuffing box 36 for the reception of the extension 37 of the stem 27 which carries the valve 38 mounted in the removable casing 39 which is attached by nuts 40 to the main casing 5 and is provided with the valve seat 41 which is normally closed by the valve 38. The pipe 42 is connected to the air brake system so that when the valve 38 is unseated air will be permitted to enter chamber of casing 39 and exhaust through the port 43 which is here controlled by the bushing 44 provided with the reduced openings 45, these openings being proportionate in size to produce the desired application effect in applying the brakes when the valve 38 is unseated.

It will thus be seen that when the electromagnet 7 is de-energized and the valve 29 seated as hereafter described that the valve 38 will be unseated and that simultaneously or coincidently with the closing of the reservoir to the engine-man's brake valve the air brake system will be automatically vented to bring the train or vehicle to a halt.

In applying the present combined reservoir and brake valve to a train control system and particularly to that shown in my copending application, Ser. No. 292,545, the same is particularly set forth in Figure 2 as above referred to.

Such system includes the traffic rail 46 having the track battery 47 and the track relay 48 which controls the signal 49.

Where the present device is used with the ramp rail 50, such ramp rail is connected to the rail 46 through the conductor 51, the battery 52 and conductor 53, which has interposed therein an electrically controlled armature 54, the ramp rail 50 being insulated from the ground, and the battery 52 being normally in said partial circuit. Carried on the vehicle are the two shoes S and S' while also carried thereby is the battery 55 with the cab relay R. The circuit normally closed upon the vehicle includes the battery 55, the conductor 56, armature 57, conductors 58 and 59, cab relay R, conductor 60, contacts 61 of shoe S, conductor 62, contacts 63 of shoe S', and conductor 64. Thus when the shoes are in normal position and not contacting the ramp 50, the cab relay R is energized by the battery 55. Thus energized, the armatures 57 and 65 are closed and thus the electromagnet 7 is energized through the following circuit which includes the battery 55, the conductor 56, the conductor 66, the hand controlled switch C, the contact 67, the conductor 68, the contact 69, the armature 65, the conductor 70, the electromagnet 7 and the conductor 71.

Should either one of the shoes as for instance shoe S' engage the ramp 50 and the ramp is energized, the battery 52 is then brought into play to energize the cap relay R and the electromagnet 7, the circuit thus made including the battery 52, the conductor 51, the ramp rail 50, shoe S', the conductors 72, the contact 73, the conductor 62, contacts 61 of shoe S, conductor 60, the neutral or cab relay R, the conductors 59, 74, and 75, contact 76 of shoe S', conductor 77, ground G to the frame and wheels of the vehicle to the track rail 46, and conductor 53.

This circuit energizes the neutral relay R, as above described, during the time the shoe rides upon the ramp 50 with the result that the circuit for the electro-pneumatic valve 7 is maintained energized.

Should, however the track ahead be occupied by a train so that the signal 49 is at "stop" then the armature 54 of the 45° to 90° signal relay D is open so that battery 52 can not supply energy to the ramp 50 and thus the above described circuit to the neutral relay R, will be opened so that the armatures 57 and 65 will be released and the circuit including the battery 55 and the electropneumatic valve 7 will be de-energized.

In the construction of the present reservoir and brake valve, it will be noted that the wearing parts are all easily removable and renewable without destroying the main casing and that every part of the same can be readily cut out to adjust and repair.

While the battery 52 is employed to form the detecting circuit for the ramp 12 and also the circuit for energizing the relay R, it is only shown as a single battery to simplify the arrangement, as it is a well known fact that a number of circuits can be connected to one battery. In this case where the single battery is used the battery is of such power as to properly charge the necessary relays, here shown as relays 16 and 17, without in any way preventing the energizing of the relay R as the resistance of all the relays combined is insufficient to consume the full battery strength. The battery 52 is so arranged that even though a shunt might exist in favor of the trackside circuits the amount of current flowing in the cab circuit in accordance with Ohm's law will be sufficient to energize R, said relay R being properly constructed to respond to the amount of current which would be traversing the cab circuit under a shunt favorable to the trackside circuits.

This device is so arranged that the reservoir pressure acting on piston 26 is sufficient to maintain valve 29 open against the train pipe pressure acting on valve 38 plus the reservoir pressure acting on the small piston 28.

What I claim as new is:

1. A combined reservoir and brake valve including a main casing having a plurality of superposed chambers, one of the chambers being provided with a vent to the atmosphere and adapted to receive air directly from the air brake system, one of the other chambers being in communication with a connection for the engineer's brake valve, while the third chamber is adapted to be connected in communication with the main reservoir, pneumatically actuated means mounted to control the flow of air through the vent and from the main reservoir to the engineer's brake valve connection, one being closed while the other is open, and means for controlling the flow of air to operate the latter means and to maintain it in the normal position.

2. A combined reservoir and brake valve including a main casing having a plurality of superposed chambers, one of the chambers being provided with a vent to the atmosphere and adapted to receive air directly from the air brake system, one of the other chambers being in communication with a connection for the engineer's brake valve, while the third chamber is adapted to be connected in communication with the main reservoir, pneumatically actuated means mounted to control the flow of air through the vent and from the main reservoir to the engineer's brake valve connection, one being closed while the other is open, and electrically actuated means for controlling the flow of air to operate the latter means and to maintain it in the normal position.

3. A combined reservoir and brake valve including a main casing having a plurality of superposed chambers, one of the chambers being provided with a vent to the atmosphere and adapted to receive air directly from the air brake system, one of the other chambers being in communication with a connection for the engineer's brake valve, while the third chamber is adapted to be connected in communication with the main reservoir, two valves one for controlling the vent and the other for controlling the flow of air from the main reservoir to the engineer's brake valve connection, both of said valves being connected together, a plunger connected to both valves and normally acted upon by air pressure to hold the venting valve closed and the other valve open, and independent means for controlling the supply of air to the piston.

4. A combined reservoir and brake valve including a main casing having a plurality of superposed chambers, one of the chambers being provided with a vent to the atmosphere and adapted to receive air directly from the air brake system, one of the other chambers being in communication with a connection for the engineer's brake valve, while the third chamber is adapted to be connected in communication with the main reservoir, two valves one for controlling the vent and the other for controlling the flow of air from the main reservoir to the engineer's brake valve connection, both of said valves being connected together, a plunger connected to both valves and normally acted upon by air pressure to hold the venting valve closed and the other valve open, and electrically actuated valve mechanism for controlling the introduction and exhaust of air to and from the piston.

5. A combined reservoir and brake valve including a casing having three superposed chambers, the uppermost chamber being provided with a vent and with a valve seated port for connection to an air brake system, the intermediate chamber being provided with means for connecting it to an engineer's brake valve, while the chamber below is provided with means for connecting it to the main reservoir, a piston mounted in the lowermost chamber, a valve stem connected to the same and extending through all chambers, two valves carried by the stem, the upper one adapted to be closed when the piston is elevated to prevent the venting of the air brake system and the lowermost adapted to be opened to permit access to the flow of air, an air channel leading from the lower chamber to the intermediate chamber, an electro-magnet, and two oppositely disposed valves controlled by the electro-magnet for converting the said port into a supply or exhaust for the piston chamber.

In testimony whereof I affix my signature.

ARCHIBALD G. SHAVER.